United States Patent
Spillner et al.

(10) Patent No.: US 11,498,465 B2
(45) Date of Patent: Nov. 15, 2022

(54) HEATING DEVICE FOR A VEHICLE SEAT

(71) Applicant: GENTHERM GMBH, Odelzhausen (DE)

(72) Inventors: Rüdiger Spillner, Augsburg (DE); Jens Keller, Nürtingen (DE)

(73) Assignee: GENTHERM GMBH, Odelzhausen (DE)

( * ) Notice: Subject to any disclaimer, the term of this patent is extended or adjusted under 35 U.S.C. 154(b) by 351 days.

(21) Appl. No.: 16/785,776

(22) Filed: Feb. 10, 2020

(65) Prior Publication Data

US 2020/0398716 A1 Dec. 24, 2020

(30) Foreign Application Priority Data

Jan. 21, 2019 (DE) .................. 10 2019000334.9

(51) Int. Cl.
| | |
|---|---|
| *A47C 7/72* | (2006.01) |
| *A47C 31/00* | (2006.01) |
| *B60N 2/56* | (2006.01) |
| *B60N 2/879* | (2018.01) |
| *B60H 1/22* | (2006.01) |
| *B60H 1/00* | (2006.01) |

(52) U.S. Cl.
CPC ....... *B60N 2/5678* (2013.01); *B60H 1/00285* (2013.01); *B60H 1/2226* (2019.05); *B60N 2/879* (2018.02)

(58) Field of Classification Search
CPC ......... B60N 2/002; B60N 2/5685; B60N 2/56
See application file for complete search history.

(56) References Cited

U.S. PATENT DOCUMENTS

| | | | | |
|---|---|---|---|---|
| 4,590,359 | A * | 5/1986 | Mobius | A47C 7/748 219/202 |
| 6,053,880 | A * | 4/2000 | Sleichter, III | A47C 7/40 5/915 |
| 6,273,810 | B1 * | 8/2001 | Rhodes, Jr | A47C 27/083 297/452.47 |
| 6,371,552 | B1 * | 4/2002 | Narita | B60R 21/0154 297/180.12 |
| 8,066,324 | B2 * | 11/2011 | Nathan | H05B 3/34 297/180.12 |
| 9,457,702 | B2 * | 10/2016 | Tüskes | H05B 3/34 |
| 9,989,282 | B2 * | 6/2018 | Makansi | H01C 7/008 |
| 10,632,879 | B2 * | 4/2020 | Dacosta-Mallet | B60N 2/5678 |
| 10,814,751 | B2 * | 10/2020 | Dragan | A47C 7/74 |
| 2009/0001778 | A1 * | 1/2009 | Nathan | H05B 3/34 297/180.12 |
| 2009/0295199 | A1 * | 12/2009 | Kincaid | B60N 2/002 297/180.12 |

(Continued)

*Primary Examiner* — Shin H Kim
(74) *Attorney, Agent, or Firm* — The Dobrusin Law Firm, P.C.

(57) ABSTRACT

A heating device for a vehicle seat, that includes at least one heating surface that is at least in sections permeable to heat radiation; and at least one heat generator arranged at least partially behind the at least one heating surface. The at least one heat generator is configured to generate the heat radiation and to emit the generated heat radiation in a direction of at least one heating surface. The at least one heating surface has a plurality of emission zones that are spaced apart from one another, for emitting the heat radiation.

19 Claims, 1 Drawing Sheet

(56) References Cited

U.S. PATENT DOCUMENTS

| | | | |
|---|---|---|---|
| 2011/0115635 A1* | 5/2011 | Petrovski | A47C 31/008 |
| | | | 340/584 |
| 2011/0226751 A1* | 9/2011 | Lazanja | A47C 7/748 |
| | | | 219/217 |
| 2016/0059670 A1* | 3/2016 | Satzger | B60H 1/2227 |
| | | | 219/202 |
| 2020/0391634 A1* | 12/2020 | Furui | B60N 2/5685 |
| 2020/0398716 A1* | 12/2020 | Spillner | B60H 1/00285 |
| 2022/0024362 A1* | 1/2022 | Halwax | B60N 2/0244 |
| 2022/0042639 A1* | 2/2022 | Grande | H05B 1/0244 |
| 2022/0063700 A1* | 3/2022 | Salter | H05B 3/34 |

\* cited by examiner

HEATING DEVICE FOR A VEHICLE SEAT

PRIORITY

This application claims priority to DE 10 2019 000 334.9 filed on Jan. 21, 2019, the entire disclosure of which is hereby incorporated by reference herein for all purposes.

FIELD

The application relates to a heating device for a vehicle seat, having at least one heating surface which is at least in sections permeable to heat radiation, and at least one heat generator which is arranged at least partially behind the at least one heating surface and designed to generate heat radiation and to emit the generated heat radiation in the direction of the at least one heating surface.

The application further relates to a vehicle seat with a seat surface which has a contact surface on the side of the vehicle seat facing the user, and a heating device which is arranged below the contact surface and is designed to emit heat radiation in the direction of the side of the vehicle seat facing the user.

BACKGROUND

Modern vehicle seats regularly have a heating device, by means of which a pleasant temperature sensation can be caused in the user of the vehicle seat. The temperature control of temperature-sensitive areas of the body, such as the shoulder or neck area, is of particular importance in increasing the feeling of comfort.

In particular in the case of vehicle seats of convertibles, blower devices are often used, by means of which preheated air is blown out in the direction of the neck area of the seat user. Since the temperature control and the control of an air flow is comparatively elaborate and the air flow sometimes significantly impairs the seating comfort, there are first deliberations to use heat generators which generate heat radiation and emit the generated heat radiation in the direction of a heating area. However, with the known heating devices, the constantly increasing expectations regarding seating comfort cannot be met.

SUMMARY

Therefore, the problem addressed by the application is that of further increasing the temperature comfort of heated vehicle seats.

The problem is solved by a heating device of the initially described type, wherein the at least one heating surface of the heating device has a plurality of emission zones, which are spaced apart from one another, for emitting the heat radiation.

By providing a plurality of emission zones spaced apart from one another, a large-area heat emission can be achieved without an excessive increase of the energy requirement for the seat temperature control. The plurality of emission zones spaced apart from one another also allows for a local adaptation of the emission intensities in the area of individual emission zones, so that a need-based and/or user-specific temperature control can be implemented. In this manner, the feeling of comfort of the user when using a corresponding vehicle seat can be significantly increased.

The heating surface of the heating device is preferably part of a material layer which is at least in sections permeable to heat radiation. The heat generator can be designed to generate infrared radiation. Accordingly, the heat radiation can be infrared radiation. The heat transfer by means of heat radiation does not cause noise emissions that impair comfort and is only insignificantly affected by convection. In addition, there is a considerable reduction in energy consumption when compared to conventional heating devices because, even at low vehicle interior temperatures, the user experiences a pleasant temperature sensation due to the heat radiation. Corresponding heating devices also have a comparatively short start-up time, so that the user quickly feels comfortable. Corresponding heating devices can be used in vehicle seats of different vehicle types, for example, in vehicle seats of convertibles.

The heating device can have a plurality of, for example, two, heating surfaces spaced apart from one another, wherein each heating surface preferably has a plurality of emission zones, which are spaced apart from one another, for emitting heat radiation. By providing a plurality of heating surfaces, the presence of a single heating area along the contact surface of the user is avoided, which would result in an unpleasant temperature sensation. The heating device can have a plurality of heat generators, each of which is designed to generate heat radiation and to emit the generated heat radiation in the direction of heating surfaces.

In one embodiment of the heating device, the heating surface has one or more contact areas, wherein a plurality of emission zones of the at least one heating surface is lowered relative to the contact areas. By lowering the emission zones relative to the contact areas, a contact protection for the emission zones is implemented, which prevents the user from unintentionally coming into contact with the emission zones or at least significantly reduces the risk of coming into contact. Since contact of the user with the emission zones is substantially avoided by lowering said emission zones, significantly higher radiation intensities can be set, resulting in a further increase of the heating power and the heating effect of the heat generator.

In addition, a heating device, in which a plurality or all of the emission zones of the at least one heating surface have different inclines, is advantageous. In particular, the plurality or all of the emission zones have different inclines with respect to a vertical line. Due to the different inclines of the emission zones, the heat radiation is emitted in different directions. The heating device can thus advantageously be used, for example, in the area of arched or curved seating areas. Furthermore, due to the different inclines of the emission zones, a directed emission of the heat radiation can be implemented, so that it is possible to align the emission zones with particularly temperature-sensitive body areas of the user.

In a further embodiment of the heating device, the heat generator has a plurality of emission elements or emission sections, wherein the emission elements or emission sections of the heat generator are each assigned to an emission zone, so that the generated heat radiation of an emission element or an emission section of the heat generator is emitted in the direction of the emission zone assigned to the respective emission element or emission section. The emission elements or emission sections of the heat generator preferably have a low heat storage capacity in order to prevent injuries, particularly burns, by unintentionally touching the emission zones. In particular, a reflector and/or an insulation is arranged on the side of the respective emission element or emission section of the heat generator facing away from the heating surface, so that the generated heat radiation is not emitted into areas of the vehicle seat which cannot influence the temperature sensation of the user. For example, the emission of heat in the direction of the seat interior can thus be avoided.

In particular, the emission zones are designed to be elongated and/or aligned essentially vertically or horizontally. A plurality of emission zones preferably run parallel to one another. In particular, the emission elements or emission sections are designed to be elongated and/or aligned essentially vertically or horizontally. A plurality of emission elements or emission sections preferably run parallel to one another.

In another embodiment of the heating device, a plurality or all of the emission elements or emission sections of the heat generator, which are each assigned to an emission zone, have different alignments and/or inclines. Due to the different alignments and/or the different inclines of the emission elements or emission sections, different emission directions can be predetermined, so that the heating device can also be used in the area of curved or arched seating areas.

In a development of the heating device, the emission elements or emission sections of the heat generator are designed to be planar and/or flat. The emission elements or emission sections of the heat generator preferably run essentially parallel to the emission zone assigned to the respective emission element or emission section. Due to the parallel alignment of emission elements or emission sections and their emission zones, a comparatively flat overall structure can be implemented, which can be integrated into the basic structure of vehicle seats with comparatively little effort and only requires a small installation space.

Furthermore, the heat generator comprises one or more heating foils, in particular surface heating foils, and/or one or more resistance conductors. The one or more resistance conductors are preferably formed from a non-metallic material. The one or more resistance conductors preferably have a cross-section of less than a square millimeter. The heating foils can be designed, for example, as graphite heating foils. Furthermore, the heating foils can be infrared heating foils. The heating foils can be partially made of ethylene propylene diene rubber (EPDM) or have an ethylene propylene diene rubber layer. If the heat generator has a plurality of emission elements, each emission element, for example, can be a heating foil. If the heat generator has a plurality of emission sections, the individual emission sections can each be heating foil sections.

In addition, a heating device, which has a control device designed to control the at least one heat generator, is advantageous. The emission elements or emission sections of the heat generator are each assigned to one of a plurality of heating groups, wherein the heating groups can be controlled independently of one another by the control device. In this way, different emission intensities can be set on the emission elements or emission sections of different groups. This allows for the implementation of a zonal allocation of the heating surface, and so the different heating zones can be heated to different degrees. For example, an asymmetrical heating of the vehicle seat can thus be realized. For example, the heating device has a right and a left heating zone. In addition, the heating device can have a middle or central heating zone. By means of the control device, different heating patterns can thus be set via the heating surface, for example, for compensating local temperature differences in the area of the vehicle seat. Such local temperature differences can be caused, for example, by an open vehicle window. In addition, a multi-zone heating adapted to the body or skin temperature of the user can thus be implemented. Setting a corresponding heating pattern can also be advantageous in the case of local sun exposure. In addition, different insulation properties of the vehicle structure can lead to an uneven temperature sensation in the user. In this case, areas near the window can be heated with more intensity, particularly at low outside temperatures.

In addition, the control device can be used to heat emission zones of the heating surface with a comparatively low risk of contact with more intensity than emission zones of the heating surface with a high risk of contact. Emission zones with a low risk of contact can, for example, be heated to temperatures in the range of 43-85° Celsius. Emission zones with a high risk of contact can, for example, be heated to temperatures in the range of 43-50° Celsius. The heat generator is preferably controlled by the control device such that the heat exchange lies between 10 watts/$m^2$ and 500 watts/$m^2$.

In another embodiment of the heating device, the control device is designed to control the heating power and/or the heat distribution of the at least one heat generator on the basis of an operating time, a driving speed, a flow speed, an air conditioning setting, a solar radiation, the vehicle interior temperature, an ambient temperature and/or a user position. Alternatively, or additionally, the control device can be designed to control the heating power and/or the heat distribution of the at least one heat generator on the basis of a user state, for example, on the basis of a temperature state of a user. Thus, individual areas of a user can be heated more intensely than others, so that areas that are especially in need of temperature control are heated more intensely. If the heating power and/or the heat distribution of the at least one heat generator is controlled on the basis of the operating time, a heating mode can be implemented, for example, in which intensive heating is implemented first before it switches to an energy-efficient continuous heating mode.

In a further embodiment of the heating device, it has one or more proximity sensors which are designed to detect an approach of an object toward the at least one heating surface. This allows for the detection of an approach of a user when the vehicle seat is put into use or the user changes position during the use of the vehicle seat. The one or more proximity sensors are preferably capacitive proximity sensors. The proximity sensors are preferably each arranged between the emission elements or emission sections of the heat generator.

The heating device is further advantageously developed, in that the control device is designed to control the heat generator on the basis of the signals of the one or more proximity sensors. Thus, for example, a quick shutdown of the heat generator or a quick shutdown of individual emission elements or emission sections of the heat generator can be realized if individual emission zones are unintentionally touched by the user of the vehicle seat or a corresponding touch is imminent. In addition, the proximity sensors allow for the generation of a heating pattern adapted to the body shape or the sitting position.

Furthermore, the heating surface has one or more reflection surfaces which are designed to reflect heat radiation. For this purpose, the reflection surfaces can be designed to be elastically deformable. For example, the reflection surfaces are realized by a coating reflecting heat radiation. A heating effect can be produced in the area of the reflection surfaces without an emission element or emission section of the heat generator being arranged in this area. In this way, the production costs of corresponding heating devices can be significantly reduced. The reflection surfaces are preferably designed to reflect heat radiation from the infrared spectrum.

One or more emission zones of the at least one heating surface are preferably directed towards a head and/or neck area.

The heating device can also have a flow generator, for example, a fan, for generating an air flow in the neck area. The air flow can be used to prevent convection cooling of the skin. For example, the flow generator can generate a mantle of air in the area of use, which can reduce the initial heating time when use of the vehicle seat commences. In addition, the heating device can comprise one or more lighting elements, for example, light-emitting diodes or LEDs. By means of the lighting elements, for example, the operating state or the operating so mode of the heating device can be displayed.

The problem addressed by this application is further solved by a vehicle seat of the initially described type, wherein the heating device of the vehicle seat is designed in accordance with one of the previously described embodiments. With regard to the advantages and modifications of the vehicle seat, reference is first made to the advantages and modifications of the heating device.

The contact surface of the vehicle seat can simultaneously be a heating surface of the heating device. The contact surface of the vehicle seat can also be arranged above the heating surface of the heating device. The distance of the emission elements or emission sections of the heat generator from the contact surface of the vehicle seat is preferably less than one centimeter. The seat surface is preferably part of the seat cover which, for example, can be made of fabric or leather.

In a further embodiment of the vehicle seat, at least one heating surface of the heating device integrated in the backrest of the vehicle seat and/or at least one heating surface of the heating device is integrated in the headrest of the vehicle seat. By integrating a heating surface of the heating device in the backrest and/or the headrest, a heatable seat unit is created which can be assembled without great effort in the course of the final assembly of the vehicle.

In a further embodiment of the vehicle seat, a plurality of emission zones of the heating surface is aligned toward a neck, shoulder and/or head area of the vehicle seat. One or more emission zones are preferably arranged in a lower area of the headrest. One or more emission zones are preferably arranged in an upper area of the backrest. A plurality of emission zones is preferably arranged and aligned such that, when the vehicle seat is used by a user, said emission zones point in the direction of the neck, shoulder and/or head of the user, and contact of the emission zones with the neck, shoulder, head and/or back of the user is essentially avoided. Further emission zones can be located on one or more extensions or one or more projections of the headrest or the backrest. The emission zones are preferably at a different distance from the seat user or from the longitudinal axis of the seat user. The heat radiation is preferably generated in the backrest of the vehicle seat, wherein a reflector for heat radiation is arranged under a neck support of the vehicle seat.

Further emission zones, which are designed to emit heat radiation, can also be arranged in a corresponding vehicle. Corresponding emission zones can be arranged, for example, in the B-pillar, the vehicle headlining or the vehicle ceiling, or outside a seating area of a vehicle seat, wherein the emission zones arranged outside a seating area of a vehicle seat are directed at a user of an adjacent vehicle seat.

A heating device (10) for a vehicle seat (50), having at least one heating surface (12) which is at least in sections permeable to heat radiation (200); and at least one heat generator (14) which is arranged at least partially behind the at least one heating surface (12) and designed to generate heat radiation (200) and to emit the generated heat radiation (200) in the direction of the at least one heating surface (12). The at least one heating surface (12) has a plurality of emission zones (16a-16d), which are spaced apart from one another, for emitting the heat radiation (200). The heating surface (12) has one or more contact areas (18a-18e), and a plurality of emission zones (16a-16d) of the at least one heating surface (12) is lowered relative to the contact areas (18a-18e).

A plurality or all of the emission zones (16a-16d) of the at least one heating surface (12) have different inclines.

The heat generator (14) has a plurality of emission elements (20a-20d) or emission sections, wherein the emission elements (20a-20d) or emission sections of the heat generator (14) are each assigned to an emission zone (16a-16d), so that the generated heat radiation (200) of an emission element (20a-20d) or an emission section of the heat generator (14) is emitted in the direction of the emission zone (16a-16d) assigned to the respective emission element (20a-20d) or emission section.

A plurality or all of the emission elements (20a-20d) or emission sections of the heat generator (14), which are each assigned to an emission zone (16a-16d), have different alignments and/or inclines.

The emission elements (20a-20d) or emission sections of the heat generator (14) are designed to be planar and/or flat and preferably run essentially parallel to the emission zone (16a-16d) assigned to the respective emission element (20a-20d) or emission section.

The heat generator (14) comprises one or more heating foils, in particular surface heating foils, and/or one or more resistance conductors.

A control device which is designed to control the at least one heat generator (14), wherein the emission elements (20a-20d) or emission sections of the heat generator (14) are preferably each assigned to one of a plurality of heating groups, and the heating groups can be controlled independently of one another by the control device.

The control device is designed to control the heating power and/or the heat distribution of the at least one heat generator (14) on the basis of an operating time, a driving speed, a flow speed, an air conditioning setting, a solar radiation, the vehicle interior temperature, an ambient temperature and/or a user position.

One or more proximity sensors (22a-22c) which are designed to detect an approach of an object toward the at least one heating surface (12).

The control device is designed to control the heat generator (14) on the basis of the signals of the one or more proximity sensors (22a-22c).

The heating surface (12) has one or more reflection surfaces which are designed to reflect heat radiation (200).

Vehicle seat (50), having a seat surface which has a contact surface on the side of the vehicle seat (50) facing the user, and a heating device (10) which is arranged below the contact surface and is designed to emit heat radiation (200) in the direction of the side of the vehicle seat (50) facing the user.

At least one heating surface (12) of the heating device (10) is integrated in the backrest (54) of the vehicle seat (50) and/or at least one heating surface (12) of the heating device (10) is integrated in the headrest (52) of the vehicle seat (50).

A plurality of emission zones (16a-16d) of the heating surface (12) is aligned toward a neck, shoulder and/or head area of the vehicle seat (50).

In the following, embodiments of the application are explained and described in more detail with reference to the attached drawings.

DETAILED DESCRIPTION

Figure 1:
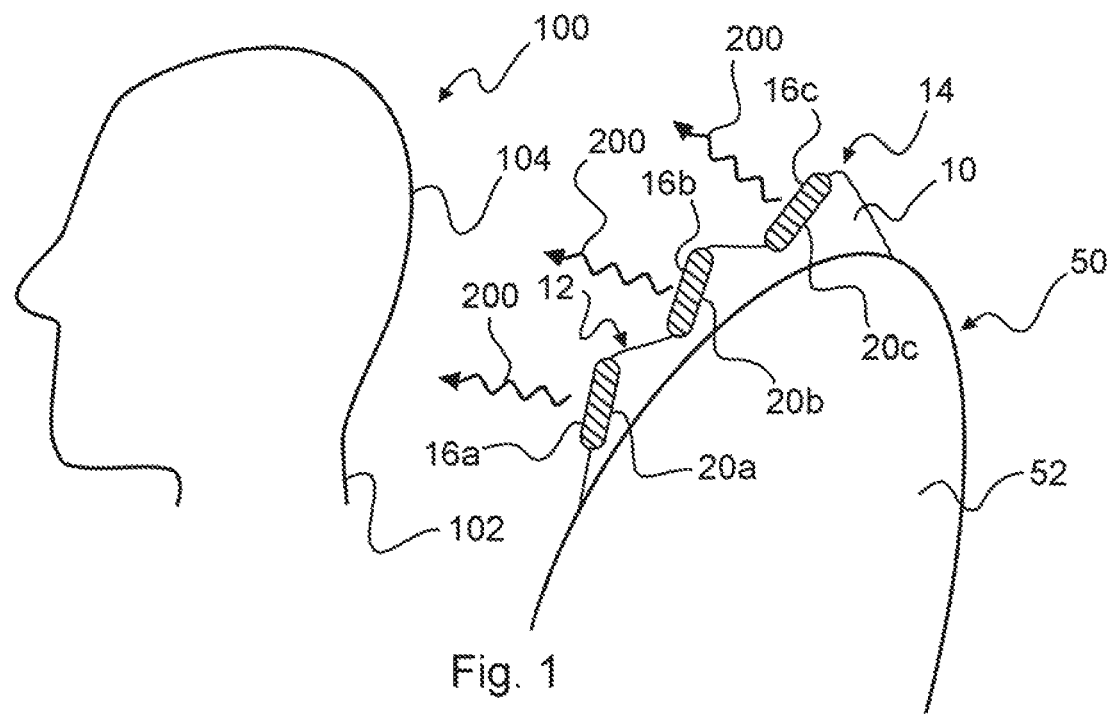
FIG. 1 shows a schematic depiction of an embodiment of the heating device.

FIG. 1 shows a heating device 10 designed as a component of a vehicle seat 50. In this case, the heating device 10 is integrated in the headrest 52 of the vehicle seat 50.

The vehicle seat 50 has a seat surface that comprises a contact surface on a side facing the user, wherein the user 100 comes into contact with the contact surface during the use of the vehicle seat 50. The heating device 10 is arranged below the contact surface of the vehicle seat 50 and is designed to emit heat radiation 200 in the direction of the neck 102 and the head 104 of the user 100.

The heating device 10 has a heating surface 12 which faces the user 100 and is permeable to heat radiation 200. In addition, the heating device 10 comprises a heat generator 14 which is arranged behind the heating surface 12 and is used to generate heat radiation 200. The generated heat radiation 200 is emitted by the heat generator 14 in the direction of the heating surface 12, wherein the heat radiation 200 passes through the heating surface 12 in order to produce a heating effect in the area of the neck 102 and the head 104 of the user 100.

The heating surface 12 of the heating device 10 has a plurality of emission zones 16a-16c, which are spaced apart from one another, for emitting the heat radiation 200 in the direction of the user 100. The emission zones 16a-16c of the heating surface 12 have different inclines with respect to a vertical line. The emission zones 16a-16c thus adapt to the upper curvature of the headrest 52.

The heat generator 14 has a plurality of elongated and essentially parallel emission elements 20a-20c, wherein the emission elements 20a-20c of the heat generator 14 are each assigned to an emission zone 16a-16c. The generated heat radiation 200 of an emission element 20a-20c of the heat generator 14 is emitted in the direction of the emission zone 16a-16c assigned to the respective emission element 20a-20c.

In the depicted embodiment, there is the possibility that the neck 102 and/or the head 104 of the user 100 comes into contact with an emission zone 16a-16c of the heating surface 12. In order to avoid injuries, in particular burns, the emission elements 20a-20c have a comparatively low heat storage capacity, so that the neck 102 and/or the head 104 can be readily positioned in the vicinity of the emission elements 20a-20c. A reflection material is arranged on the side of the emission elements 20a-20c facing away from the user 10, so that heat radiation 200, which is emitted in the direction of the seat interior, is reflected by the reflection material and is diverted in the direction of the user 100. Furthermore, an insulation layer can be positioned behind the emission elements 20a-20c, which avoids or at least considerably reduces heat input into the seat interior.

The emission elements 20a-20c are designed as elongated and flat heating foils which run essentially parallel to the respective emission zones 16a-16c. The individual emission elements 20a-20c designed as infrared heating foils run essentially horizontally and are aligned parallel to one another. The individual emission elements 20a-20c furthermore have resistance conductors which are formed from a non-metallic material. In this case, the cross-section of the resistance conductors is less than 1 mm$^2$.

In the depicted embodiment, the headrest 52 of the vehicle seat 50 is covered with a cover made, for example, of leather or fabric. The contact surface of the seat surface facing the user 100 is part of the headrest cover.

Figure 2:
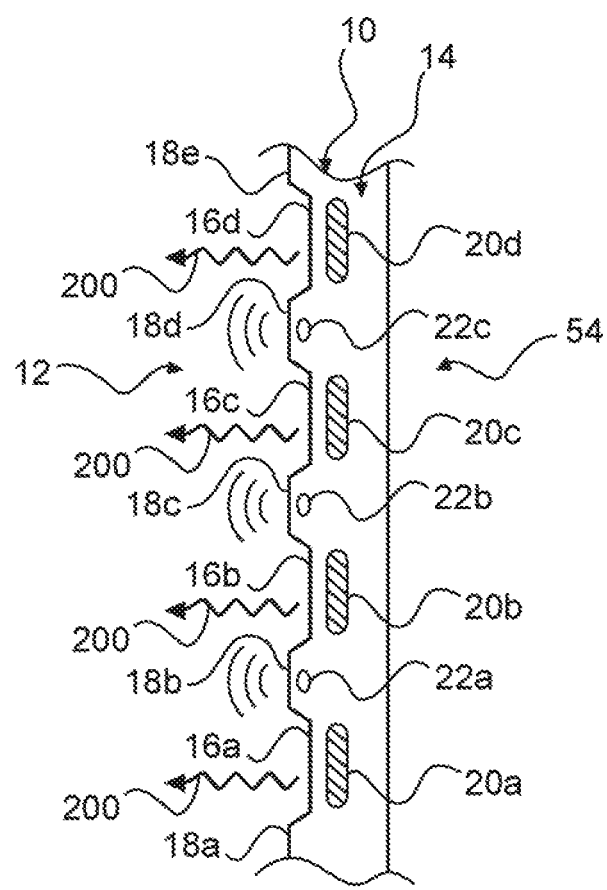
FIG. 2 shows a schematic depiction of a further embodiment of the heating device.

FIG. 2 shows a section of a backrest 54 of a vehicle seat 50, wherein a heating device 10 is integrated in the backrest 54.

The heating device 10 again has a heating surface 12 which faces the user 100 and has a 28 plurality of emission zones 16a-16d, which are spaced apart from one another, for emitting heat radiation 200. In addition to the emission zones 16a-16d, the heating surface 12 has a plurality of contact areas 18a-18e, wherein the emission zones 16a-16d are lowered relative to the contact areas 18a-18e. By lowering the emission zones 16a-16d, a contact protection for the emission zones 16a-16d is implemented, thus preventing contact by the user 100.

The heat generator 14 which generates the heat radiation 200 has a plurality of elongated and flat graphite heating foils which are arranged behind the respective emission zones 16a-16d. Proximity sensors 22a-22d, which are designed to detect an approach of an object toward the heating surface 12, are positioned between the emission elements 20a-20d designed as heating foils. The proximity sensors 22a-22c are designed as capacitive proximity sensors and can be used to detect the approach of a user 100 toward the heating surface 12.

The heat generator 14 comprising the emission elements 20a-20d can be controlled by means of a control device on the basis of the signals from the proximity sensors 22a-22c. Thus, for example, a quick shutdown of the heat generator 14 can be realized before a user 100 touches an emission zone 16a-16c. As a result, burns are effectively prevented.

The emission elements 20a-20d of the heat generator 14 can, for example, each be assigned to one of a plurality of heating groups. For example, the backrest 54 of the vehicle seat 50 comprises a right heating zone, a middle or central heating zone, and a left heating zone, wherein emission elements 20a-20d of a heating group are assigned to the respective heating zones. The heating groups can then be controlled independently of one another by means of the control device, so that different heating or emission patterns can be realized via the backrest surface. For example, an asymmetrical heating of the backrest 54 can thus be implemented, which compensates for the uneven cooling input into the vehicle interior due to an open window. The different heating zones can also be used to compensate for further environmental influences which impair the seating comfort, for example, an uneven sun exposure of the user 100.

Surfaces with a low risk of contact can be heated more intensely than surfaces with a relatively high risk of contact by means of independently controllable heating groups.

Alternatively to the depicted embodiments, the heating device 10 can also be integrated in a vehicle seat 50 in the area of a neck support. In such case, the emission zones 16a-16d are arranged and aligned, for example, such that they point in the direction of the neck of the user 100 when the vehicle seat 50 is used by a user 100, wherein contact of the emission zones 16a-16d with the neck of the user 100 is essentially avoided. In addition, further emission zones 16a-16d can also be arranged on extensions or projections of the headrest 52 or the backrest 54.

In a corresponding vehicle, further emission zones can also be arranged in the area of the B-pillar, on the vehicle headlining, or on a side surface or rear of a vehicle seat. The emission zones arranged on a side surface or rear of a vehicle seat are then directed toward a seating area of another vehicle seat of the vehicle.

REFERENCE SIGNS

10 Heating device
12 Heating surface
14 Heat generator
16a-16d Emission zones
18a-18e Contact areas
20a-20d Emission elements
22a-22c Proximity sensors
50 Vehicle seat
52 Headrest
54 Backrest
100 User
102 Neck
104 Head
200 Heat radiation

The invention claimed is:

1. A heating device for a headrest of a vehicle seat, the heating device comprising:
at least one heating surface; and
at least one heat generator arranged at least partially behind the at least one heating surface, the at least one heat generator comprises a plurality of emission elements that are configured to generate heat radiation and to emit the generated heat radiation in a direction of a head and/or neck of an occupant of the vehicle seat,
wherein the plurality of emission elements are elongated and flat heating foils that are spaced apart from one another along a vertical extension of the headrest, and are arranged at different inclines relative to each other with respect to a vertical line of the vehicle seat to adapt to an upper curvature of the headrest; and
wherein intermediate regions of the at least one heating surface that are arranged between adjacent elements of the plurality of emission elements is arranged at different inclines relative to the inclines of the adjacent emission elements.

2. The heating device according to claim 1, wherein the at least one heating surface comprises one or more contact areas, and
wherein the plurality of emission zones of the at least one heating surface are lowered relative to the one or more contact areas.

3. The heating device according to claim 1, wherein the at least one heat generator has a plurality of emission elements or emission sections, the emission elements or emission sections are each assigned to the plurality of emission zones, so that the generated heat radiation of the emission element or the emission section is emitted in a direction of the emission zone assigned to the respective emission element or emission section.

4. The heating device according to claim 3, wherein a plurality or all of the emission elements or emission sections of the heat generator have different alignments and/or inclines.

5. The heating device according to claim 1, wherein characterized a control device is designed to control the at least one heat generator,
wherein the emission elements or emission sections are each assigned to one of a plurality of heating groups, and the heating groups can be controlled independently of one another by the control device.

6. The heating device according to claim 5, wherein the control device is configured to control heating power and/or heat distribution of the at least one heat generator on a basis of an operating time, a driving speed, a flow speed, an air conditioning setting, a solar radiation, a vehicle interior temperature, an ambient temperature, a user position, or a combination thereof.

7. The heating device according to claim 1, wherein the heating device comprises one or more proximity sensors configured to detect an approach of an object toward the at least one heating surface.

8. The heating device according to claim 7, wherein a control device is configured to control the at least one heat generator on a basis of signals of the one or more proximity sensors.

9. The heating device according to claim 7, wherein the at least one heating surface has one or more reflection surfaces to reflect heat radiation.

10. A vehicle seat comprising:
a seat surface with a contact surface on a side of the vehicle seat facing the user, and
the heating device according to claim 1, the heating device is arranged below the contact surface and is configured to emit heat radiation in a direction of the side of the vehicle seat facing the user.

11. The vehicle seat according to claim 10, wherein the at least one heating surface is integrated in a backrest of the vehicle seat and/or integrated in a headrest of the vehicle seat.

12. The vehicle seat according to claim 10, wherein a plurality of emission zones of the heating surface is aligned toward a neck, shoulder and/or head area of the vehicle seat.

13. The heating device according to claim 1, wherein the intermediate regions of the at least one heating surface that are arranged between adjacent elements of the plurality of emission elements are arranged at different inclines relative to each other.

14. The heating device according to claim 1, wherein, relative to the vertical line of the vehicle seat, one or more of the elements of the plurality of emission elements are arranged at a greater vertical inclination than one or more of the intermediate regions of the at least one heating surface.

15. The heating device according to claim 14, wherein, relative to the vertical line of the vehicle seat, one or more of the elements of the plurality of emission elements are arranged at a greater vertical inclination than one or more of the intermediate regions of the at least one heating surface.

16. A heating device for a headrest of a vehicle seat, the heating device comprising
a heating surface which faces a head and/or neck of a user or occupant of the vehicle seat;
a plurality of emission elements that are configured to generate heat;
wherein at least some of the plurality of emission elements are elongated and flat heating foils that are spaced apart from one another along a vertical extension of the headrest, and are arranged at different inclines relative to each other with respect to a vertical line of the vehicle seat; and wherein one or more intermediate regions of the at least one heating surface that are arranged between at least some of the adjacent elements of the plurality of emission elements are arranged at different inclines relative to the inclines of the adjacent emission elements.

17. The heating device according to claim 16, wherein at least some of the intermediate regions are arranged at different inclines relative to each other with respect to the vertical line of the vehicle seat.

18. The heating device according to claim 16, wherein relative to the vertical line of the vehicle seat, at least some of the plurality of emission elements are arranged at a greater vertical inclination than at least some of the intermediate regions of the at least one heating surface.

19. The heating device according to claim 17, wherein relative to the vertical line of the vehicle seat, at least some of the plurality of emission elements are arranged at a greater vertical inclination than at least some of the intermediate regions of the at least one heating surface.

* * * * *